(12) United States Patent
Smith et al.

(10) Patent No.: US 10,346,415 B1
(45) Date of Patent: *Jul. 9, 2019

(54) DETERMINING QUESTION AND ANSWER ALTERNATIVES

(71) Applicant: Google Inc., Mountain View, CA (US)

(72) Inventors: David Smith, Brooklyn, NY (US); Engin Cinar Sahin, New York, NY (US); George Andrei Mihaila, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/088,804

(22) Filed: Apr. 1, 2016

Related U.S. Application Data

(63) Continuation of application No. 13/803,628, filed on Mar. 14, 2013, now Pat. No. 9,336,269.

(51) Int. Cl.
*G06F 16/2457* (2019.01)
*G06F 16/28* (2019.01)

(52) U.S. Cl.
CPC .. *G06F 16/24578* (2019.01); *G06F 16/24573* (2019.01); *G06F 16/285* (2019.01)

(58) Field of Classification Search
None
See application file for complete search history.

(56) References Cited

U.S. PATENT DOCUMENTS

| 8,065,299 | B2 | 11/2011 | Curtis et al. |
| 8,103,947 | B2 | 1/2012 | Lunt et al. |
| 8,135,712 | B1 | 3/2012 | Coladonato et al. |
| 8,452,798 | B2 | 5/2013 | Myaeng et al. |
| 8,473,499 | B2 | 6/2013 | Song et al. |
| 8,515,764 | B2 | 8/2013 | Nakano et al. |

(Continued)

FOREIGN PATENT DOCUMENTS

WO 2012/128951 9/2012

OTHER PUBLICATIONS

"Answering your questions with Bing and Wolfram Alpha," Bing Blogs [online], Aug. 10, 2010 [retrieved on Jun. 10, 2014]. Retrieved on the Internet: <URL: http://blogs.bing.com/search/2010/08/10/answering-your-questions-with-bing-and-wolfram-alpha/>, 5 pages.

(Continued)

*Primary Examiner* — Amresh Singh
(74) *Attorney, Agent, or Firm* — Fish & Richardson P.C.

(57) ABSTRACT

A computer-implemented method can include identifying one or more candidate topics from a query. The method can generate, for each candidate topic, a candidate topic-answer pair that includes both the candidate topic and an answer to the query for the candidate topic. The method can obtain search results based on the query, wherein one or more of the search results references an annotated resource. For each candidate topic-answer pair, the method can determine a score for the candidate topic-answer pair for use in determining a response to the query, based on (i) an occurrence of the candidate topic in the annotations of the resources referenced by one or more of the search results, and (ii) an occurrence of the answer in annotations of the resources referenced by the one or more search results, or in the resources referenced by the one or more search results.

20 Claims, 6 Drawing Sheets

(56) References Cited

U.S. PATENT DOCUMENTS

| | | |
|---|---|---|
| 8,666,983 B2 | 3/2014 | Brill et al. |
| 2007/0050339 A1* | 3/2007 | Kasperski ......... G06F 17/30967 |
| 2012/0078902 A1 | 3/2012 | Duboue et al. |
| 2014/0188935 A1* | 7/2014 | Vee ..................... G06F 17/3043 |
| | | 707/771 |

OTHER PUBLICATIONS

Goodwin, "Google searches surge after knowledge graph launch," Search Engine Watch [online], May 30, 2012 [retrieved on Jun. 10, 2014]. Retrieved from the Internet: <URL: http://searchenginewatch.com/article/2180762/Google-Searches-Surge-After-Knowledge-Graph-Launch>, 4 pages.

Lardinois, "Google just got a whole lot smarter, launches its knowledge graph," Tech Crunch [online], May 16, 2012 [retrieved on Jun. 10, 2014]. Retrieved from the Internet: < URL: http://techcrunch.com/2012/05/16/google-just-got-a-whole-lot-smarter-launches-its-knowledge-graph>, 7 pages.

Sullivan, "Google launches knowledge graph to provide answers, not just links," Search Engine Land [online], May 16, 2012 [retrieved on Jun. 10, 2014]. Retrieved from the Internet: <URL: http://searchengineland.com/google-launches-knowledge-graph-121585>, 9 pages.

\* cited by examiner

DETERMINING QUESTION AND ANSWER ALTERNATIVES

CROSS-REFERENCE TO RELATED APPLICATIONS

This application is a continuation application of and claims priority to U.S. application Ser. No. 13/803,628, filed on Mar. 14, 2013, the entire contents of which are hereby incorporated by reference.

TECHNICAL FIELD

This document generally relates to search engines.

BACKGROUND

Many people use the Internet to obtain information. For example, users may submit queries about a topic for which they want information. In some situations, these queries can be submitted to a search system that is configured to search a collection of documents to obtain information pertaining to the queries. In some instances, the queries can be a collection of words that are submitted to the search system using Boolean operators (e.g., OR and AND) or Natural Language formulations to perform the search. Some queries may indicate that the user is searching for a particular fact to answer a question reflected in the query.

SUMMARY

When a question-and-answer (Q&A) system receives a query, such as in the search context, the system must interpret the query, determine whether to respond, and if so, select one or more answers with which to respond. Not all queries may be received in the form of a question, and some queries might be vague or ambiguous. For example, a query that recites "Washington's age" is not provided in the form of a question, and the subject matter of the query is vague. Washington could refer, for example, to President George Washington, actor Denzel Washington, the state of Washington, or Washington D.C. The Q&A system would then have to determine whether the user who provided the query is likely to be interested in receiving a factual answer relevant to the query, and if so, what the query most likely refers to or is asking. The techniques described in this paper describe systems and methods for determining whether to respond to a query with one or more factual answers, including how to rank multiple candidate topics and answers in a way that indicates the most likely interpretation(s) of a query.

In one implementation, a computer-implemented method can include identifying one or more candidate topics from a query. The method can generate, for each candidate topic, a candidate topic-answer pair that includes both the candidate topic and an answer to the query for the candidate topic. The method can obtain search results based on the query, wherein one or more of the search results references an annotated resource, wherein an annotated resource is a resource that, based on an automated evaluation of the content of the resource, is associated with an annotation that identifies one or more likely topics associated with the resource. For each candidate topic-answer pair, the method can determine a score for the candidate topic-answer pair based on (i) an occurrence of the candidate topic in the annotations of the resources referenced by one or more of the search results, and (ii) an occurrence of the answer in annotations of the resources referenced by the one or more search results, or in the resources referenced by the one or more search results. The method can also include determining whether to respond to the query with one or more answers from the candidate topic-answer pairs, based on the scores.

These and other implementations described herein can optionally include one or more of the following features. The method can determine whether to respond to the query by comparing one or more the scores to a predetermined threshold. The method can further include selecting, based on the comparison of the one or more scores to the predetermined threshold, one or more answers to respond to the query from among the candidate topic-answer pairs. The method can also determine, based on the comparison of the one or more scores to the predetermined threshold, to not respond to the query with an answer from among the candidate topic-answer pairs. In some implementations, the method can select, based on the scores, one or more answers to respond to the query from among the candidate topic-answer pairs. The one or more selected answers may include an answer from the candidate topic-answer pair that has a highest score among the scores of each of the candidate topic-answer pairs. The selected one or more answers can be provided to a user at a client computing device.

In some implementations, each candidate topic can be represented by a node in a graph of interconnected nodes that each represents a known topic. Generating, for each candidate topic, a candidate topic-answer pair that includes the candidate topic and an answer to the query for the candidate topic can include identifying an attribute value from the node that represents each candidate topic, respectively. The answer in one or more of the candidate topic-answer pairs can be represented by a node in the graph of interconnected nodes.

In some implementations, the score can be further based on a respective query relevance score of the search results that include annotations in which the candidate topic occurs. The method can also base the scores for one or more of the candidate topic-answer pairs on a confidence measure associated with each of one or more annotations in which the candidate topic in a respective candidate topic-answer pair occurs, or each of one or more annotations in which the answer in a respective candidate topic-answer pair occurs.

In another implementation, a computer system can include one or more computing devices and an interface at the one or more computing devices that is programmed to receive a query. The system can include a knowledge repository that is accessible to the one or more computing devices and that includes a plurality of topics, each topic including one or more attributes and associated values for the attributes. A mapping module that is installed on the one or more computing devices can identify one or more candidate topics from the topics in the knowledge repository, wherein, the identified candidate topics are determined to relate to a possible subject of the query. An answer generator that is installed on the one or more computing devices can generate, for each candidate topic, a candidate topic-answer pair that includes (i) the candidate topic, and (ii) an answer to the query for the candidate topic, wherein the answer for each candidate topic is identified from information in the knowledge repository. A search engine that is installed on the one or more computing devices and can return search results based on the query, wherein one or more of the search results references an annotated resource. An annotated resource is a resource that, based on an automated evaluation of the content of the resource, is associated with an annotation that identifies one or more likely topics associated with the resource. A scoring module installed on the one or more computing devices can determine a score for each candidate topic-answer pair based on (i) an occurrence of the candidate topic in the annotations of the resources referenced by one or more of the search results, and (ii) an occurrence of the answer in annotations of the resources referenced by the one or more search results, or in the resources referenced by the one or more search results. A front-end system at the one or more computing devices can determine whether to respond to the query with one or more answers from the candidate topic-answer pairs, based on the scores.

These and other implementations described herein can optionally include one or more of the following features. The front end system can determine whether to respond to the query based on a comparison of one or more of the scores to a predetermined threshold. Each of the plurality of topics that is included in the knowledge repository can be represented by a node in a graph of interconnected nodes. The one or more returned search results from the search engine can be associated with a respective query relevance score and the score can be determined by the scoring module for each candidate topic-answer pair based on the query relevance scores of one or more of the search results that reference an annotated resource in which the candidate topic occurs. For one or more of the candidate topic-answer pairs, the score can be further based on a confidence measure associated with each of one or more annotations in which the candidate topic in a respective candidate topic-answer pair occurs, or each of one or more annotations in which the answer in a respective candidate topic-answer pair occurs.

In one implementation, a tangible computer-readable storage device can have instructions stored thereon that, when executed by one or more computer processors, cause the processors to perform operations. The operations can include identifying one or more candidate topics from a query and generating for each candidate topic, a candidate topic-answer pair that includes the candidate topic and an answer to the query for the candidate topic. The operations can further include obtaining search results based on the query, wherein one or more of the search results references an annotated resource, wherein an annotated resource is a resource that, based on an automated evaluation of the content of the resource, is associated with an annotation that identifies one or more likely topics associated with the resource. For each candidate topic-answer pair, the operations can determine a score for the candidate topic-answer pair based on (i) an occurrence of the candidate topic in the annotations of the resources referenced by one or more of the search results, and (ii) an occurrence of the answer in annotations of the resources referenced by the one or more search results, or in the resources referenced by the one or more search results. The operations can also include determining whether to respond to the query with one or more answers from the candidate topic-answer pairs, based on the scores.

These and other implementations described herein can optionally include one or more of the following features. Determining whether to respond to the query can include comparing one or more of the scores to a predetermined threshold. The operations can include determining a query relevance score for one or more of the returned search results, wherein the score for one or more of the candidate topic-answer pairs is further based on the query relevance scores of one or more of the search results that reference an annotated resource in which the candidate topic occurs. For one or more of the candidate topic-answer pairs, the score can further be based on a confidence measure associated with (i) each of one or more annotations in which the candidate topic in a respective candidate topic-answer pair occurs, or (ii) each of one or more annotations in which the answer in a respective candidate topic-answer pair occurs.

Particular implementations of the subject matter described in this specification can be implemented so as to realize one or more of the following advantages. Candidate responses to the query can be scored so that a Q&A system or method can determine whether to provide a response to the query. If the query is not asking a question or none of the candidate answers are sufficiently relevant to the query, then no response may be provided. Additionally, the techniques described herein can interpret a vague or ambiguous query and provide a response that is most likely to be relevant to what a user desired in submitting the query.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for responding to factual questions from a query. In some instances, when a user provides a query at a search interface, it is most helpful to the user to respond directly with one or more facts that answer a question determined to be relevant to the query. For example, in a query that asked, "How tall is Mount Everest?", responding directly with an answer (e.g., "Mount Everest has an elevation of 29,029 feet") may be more useful than a page of search results that requires the user to follow the results to a document referenced by the search results to find the answer therein. A question-and-answer (Q&A) system can be used to respond to such queries as described.

Figure 1:
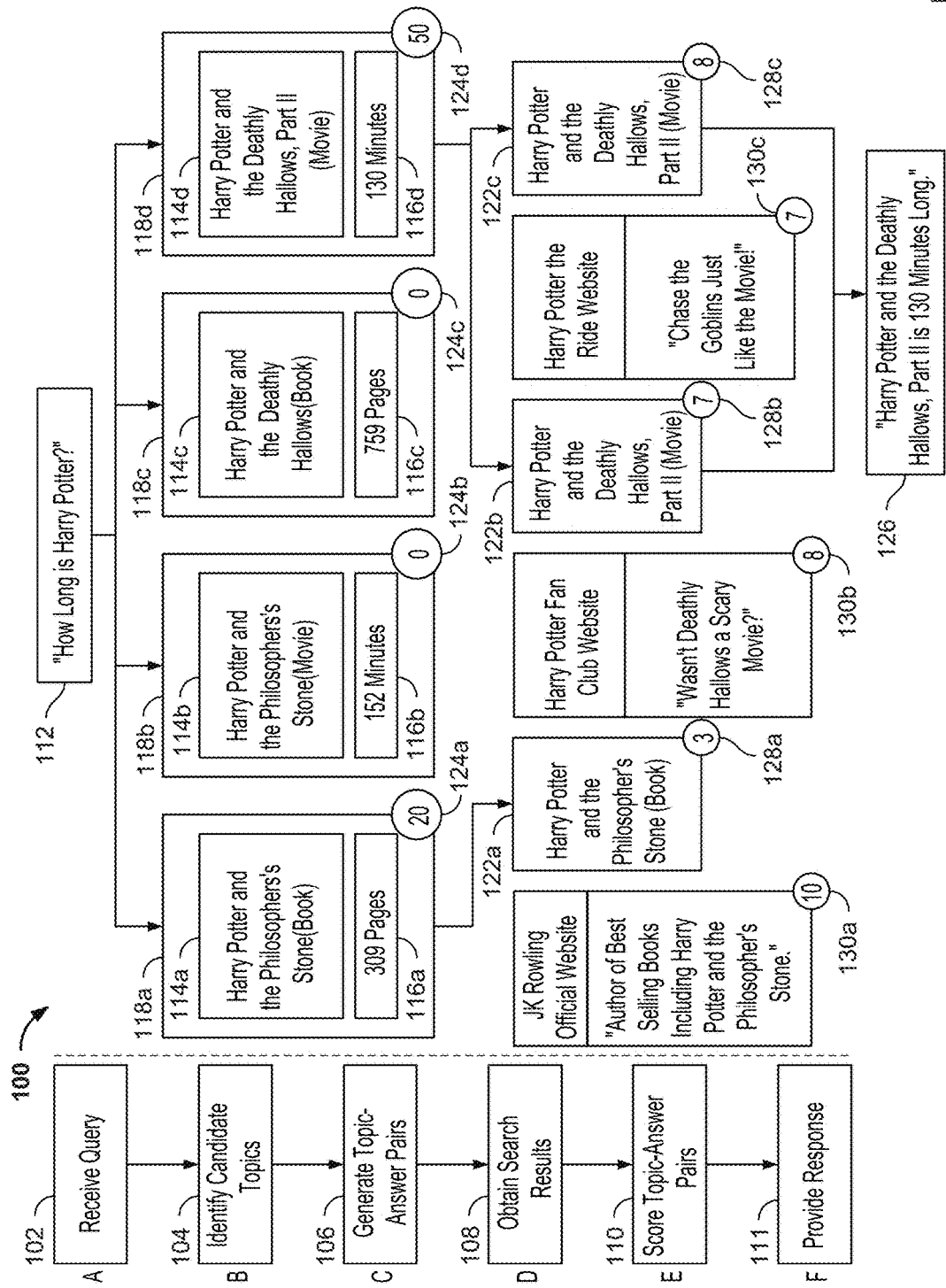
FIG. 1 depicts a flow diagram of an example topic-answer selection process.

The flow diagram depicted in FIG. 1 shows an example method 100 that can receive a query 112 and provide a response 124 that a Q&A system determines to be relevant to the query 112. The method can be implemented by any of a variety of computing devices/systems, such as a Q&A system 200, which is described further below for FIG. 2.

The method 100 can receive a query 112. The query 112 may be received in any of a variety of ways, include a range of content, and may be structured in various forms. For instance, a user at a client computing device may have a specific question in mind and submit the query 112 to a search interface that submits queries to one or more systems such as a Q&A system 200 and/or a web search engine. In some implementations, the query 112 may be provided as text, or may be transcribed to text based on user voice input. In other implementations, the user need not be a person or the query 112 need not be received from a user. For instance, a computer system may generate queries 112 to be provided in batch, and the queries may include one or more words, phrases, clauses, or questions. The example query 112 depicted in FIG. 1 asks the question, "How long is Harry Potter?" This query 112 is in the form of a question, which can indicate that the user who provided the query 112 is likely searching for one or more facts to answer the question.

The query 112 can be vague or ambiguous. For example, the method of FIG. 1 can identify "Harry Potter" as the subject of the query 112. But the terms "Harry Potter" are ambiguous, as they may refer to one or more particular topics such as any of the seven books in the Harry Potter franchise, any of the film adaptations of the books, or a ride, theme park, audiobook, cartoon, etc. associated with the Harry Potter franchise. The query 112 could also refer to the Harry Potter character itself. Depending on which topic the user intended to refer to in the query 112, a different answer can apply, or even different types of answers. Thus, if the query 112 is referring to a book, the user probably wants to know the number of words or pages in the book. If, on the other hand, the query 112 is referring to one of the movies, the film's running time is probably of interest. Or if "Harry Potter" refers to the fictional character, then length may refer to his height.

The method 100 can identify candidate topics 114a-d as possible interpretations of the subject of the query 112. For instance, in response to receiving the Harry Potter query 112, candidate topics 114a-d include, among other topics, HARRY POTTER AND THE PHILOSOPHER'S STONE (book) (114a); HARRY POTTER AND THE PHILOSOPHER'S STONE (film) (114b); HARRY POTTER AND THE DEATHLY HALLOWS (book) (114c); and HARRY POTTER AND THE DEATHLY HALLOWS, PART II (film) (114d). Additional topics corresponding to the query 112 can also be identified.

The candidate topics 114a-d are each identified from a plurality of known topics that can be stored in a knowledge base 222, such as the one described below in reference to FIGS. 2 and 5. The knowledge base 222 can contain information about a wide range of topics, attributes associated with each topic, and relationships among the topics. In one example implementation of the knowledge base 222, the topics can be represented by nodes in a graph of interconnected nodes. For example, one node can represent the book HARRY POTTER AND THE PHILOSOPHER'S STONE, which was identified as candidate topic 114a. The topic can have various attributes associated with the node. Some of the attributes may be common to a type or category of the topic. For example, since the topic relates to a book, the book's attributes can include genre, ISBN number, length, publication date, author, publisher, characters, and sales data. Others attributes can be unique to the particular topic regardless of its type. The knowledge base 222 includes facts that have been identified for some or all of the attributes for a topic. For example, it can include factual data that indicates HARRY POTTER AND THE PHILOSOPHER'S STONE is 309 pages long and was first published in 1997 by Bloomsbury. On the other hand, topics relating to films may have a different set of attributes such as a running time, release date, actors, directors, budget, production studio, etc. Some of the attributes can form relationships among topics. For example, a "film adaptation" attribute of the first HARRY POTTER book (candidate topic 114a) can connect the book topic 114a to the corresponding film topic 114b. The knowledge base 222 can obtain information to build its knowledge of topics, attributes, and relationships in any number of ways, such as crawling and scraping information from electronic resource 224s across one or more networks. In some implementations, information can also be provided to the knowledge base 222 manually by authorized system operators or through a crowdsourcing operation.

The method 100 can determine possible interpretations of the query 112 and identify candidate topics 114 from the knowledge base 222 that correspond with these interpretations. In FIG. 1, for example, the candidate topics 114a-d are each determined to relate to the phrase "Harry Potter" from the query 112. The candidate topics 114a-d can be identified in one implementation by comparing a string or substring from the query 112 with strings or substrings of the topics and attribute information in the knowledge base 222. Using the words "Harry Potter" from the query 112, topics can be identified by searching the knowledge base 222, or an index of the knowledge base 222, for the string "Harry Potter" or variant strings such as "harry potter" or "harry poter." Using this technique, each of candidate topics 114a-d can be identified from the knowledge base 222 since each of the topics 114a-d include "Harry Potter" within strings associated with the topic including the book and film names.

In some implementations, candidate topics 114a-d can be identified using one or more other techniques. In one implementation, a node in the data graph that represents a topic can be identified as a candidate topic 114 using, for example, string comparison, and further candidate topics can be identified based on relationships/connections between the nodes. For example, the book HARRY POTTER AND THE DEATHLY HALLOWS is initially identified as candidate topic 114c based on the common phrase "Harry Potter" in the name of the book and the query 112. The film HARRY POTTER AND THE DEATHLY HALLOWS, PART II can be identified as candidate topic 114d based on string comparison as well, or based on a connection between topics 114c and 114d in the knowledge base 222 reflecting that the film is an adaptation of the book. Thus, if another example query 112 asked, "Where was California's governor born?", candidate topics 114 could be identified by first matching the word "California" with a question topic that represents the state of California in the knowledge base 222, and then identifying one or more intermediate topics that are connected to the state of California from which an answer could be identified. For instance, California may have a "Governor" attribute that links the State's topic with topics for each person who has been governor of the state. The candidate topics 114 can then be identified from the intermediate topics as people who were or a person who is presently governor of California such as Jerry Brown, Arnold Schwarzenegger, or Ronald Reagan.

Other implementations for identifying candidate topics 114 that correspond to a subject of a query 112 are also contemplated. For example, if a string matching algorithm yields a large number of candidate topics 114 from the knowledge base 222, a most relevant subset of the candidate topics 114 can be determined. In one implementation, the subset can correspond to topics that are associated with resource 224s such as web pages and other electronic documents or files that are referenced by search results generated using the query 112. For example, a query that asked for "John Smith's height" might return dozens or more relevant topics using string comparison algorithms with topics in the knowledge base 222. But by identifying only the John Smiths that are mentioned in top-ranked search results, a most relevant subset can be selected as the candidate topics 114 that the user is most likely referring to in the query 112. In some implementations, the most relevant subset can be predicted and identified by a score associated with each topic in the knowledge base 222. The topic score can indicate a measure of the particular topic's prominence or popularity, for example, based on its prevalence in web sites, recent news articles, and/or social media trends. The topic score can also be user-specific to reflect that some topics may be more or less relevant to particular individual users or groups of users than to members of the general public. For instance, a query 112 with the subject, "Washington," may yield many topics in the knowledge base 222 that have "Washington" included in a name or other relevant attribute for the topic. Based on the prevalence of literature about George Washington in one or more corpora of data such as the internet, the George Washington topic may have a higher topic score than a topic, for example, of Washington County, Minn. Therefore, George Washington can be identified as a candidate topic 114 before the Minnesota county. However, if the method determines that the query 112 originated from a user who lives in Washington County, Minn., the topic score for the county may be adjusted for that user such that Washington County is more likely to be selected among the most relevant subset of candidate topics 114 for that user.

The method 100 can generate a candidate topic-answer pair 118 for each candidate topic 114. Each candidate-topic answer pair 118 includes an answer 116. The answers 116 can be identified, for example, from information stored in the knowledge base 222. In some cases, the answers 116 can be identified from an attribute associated with a respective candidate topic 114. For example, candidate topic 114a is HARRY POTTER AND THE PHILOSOPHER'S STONE (book). One attribute of the book in knowledge base 222 is the book's page length, which is 309 pages. The corresponding answer 116a to candidate topic 114a is therefore 309 pages. Together, candidate topic 114a and answer 116a form a candidate topic-answer pair 118a. Similarly, candidate topic 118b—HARRY POTTER AND THE PHILOSOPHER'S STONE (film)—has a running time attribute of 152 minutes that is identified as being the relevant answer 116b to a query 112 about the length of a film. Together, candidate topic 114b and answer 116b form candidate topic-answer pair 118b. The same pattern can apply in generating candidate topic-answer pairs 118c and 118d.

In addition to these facts, e.g., page length, running time, answers 116 can also be actual topics in the knowledge base 222, which may be connected to a candidate topic 114. For example, in a query 112 that asked "Who wrote Harry Potter?", HARRY POTTER AND THE PHILOSOPHER'S STONE (book), is identified as a candidate topic 118 regarding the question topic or query subject. One attribute of the book is its author, J. K. Rowling. However, unlike the answers 118a-d depicted in FIG. 1, which are topics or nodes in the knowledge base 222 themselves, J. K. Rowling is a separate topic that can be represented by a node in the knowledge base 222 and that is connected to the PHILOSOPHER'S STONE (book) topic.

Once an answer 116 has been determined for each candidate topic 114, and corresponding candidate-topic answer pairs 118 generated, the method 100 can submit the query 112 to a search engine 216, such as that described below with reference to FIG. 2. The search engine 216 can obtain search results 120 in response to the query by searching, for example, one or more corpora of data on one or more networks for resource 224s that are relevant to the query 112. The resource 224s can include web pages, web sites, blogs, PDFs, or any other electronic document, for example. In some implementations, the search results 120 can be identified from searching content of the resource 224s directly. Search results 120 can also be obtained from an index 230 of resource 224s that have previously been crawled and indexed. An index 230 can be useful to a search engine 216 to enable more efficient searching of relevant data that has been scraped and structured into a database prior to receiving a search query, particularly when large amounts of data, such as the internet, provides the corpora of searchable resource 224s.

Referring again to FIG. 1, the method 100 obtains multiple search results 120a-c based on query 112 using, for example, the search engine 216. The search results can each reference a resource 224 that has some relevance to the query 112. For example, the top three search results 120a-c depicted in FIG. 1 are, respectively, J. K. Rowling's Official Website, a Harry Potter Fan Club Website, and a website for Harry Potter the Ride. The resource 224 referenced by the top search result 120a, J. K. Rowling's Official Website, includes content that notes J. K. Rowling is the "Author of worldwide best-selling books including HARRY POTTER AND THE PHILOSOPHER'S STONE." Based on an evaluation of content, one or more annotations 122 can be determined that identify likely topics associated with a resource 224 120. The identified topics in the annotations 122 can be among the same topics stored and structured in the knowledge base 222 from which the candidate topics 118 were identified. Therefore, one or more annotations 122 associated with the search results 120 can correspond to one or more of the candidate topics 118 in that a common topic occurs in both the annotation 122 and a candidate topic 118.

For example, based on the occurrence of HARRY POTTER AND THE PHILOSOPHER'S STONE in the text of J. K. Rowling's Official website (120a), an annotation 122a is created that associates the site 120a with the topic for the corresponding book in the knowledge base 222. Similarly, the second-ranked search result 120b, which references the Harry Potter Fan Club website, contains text from a member's post that asks, "Wasn't DEATHLY HALLOWS a scary movie?" From this content, the fan club website is annotated (122b) with the topic that indicates the film HARRY POTTER AND THE DEATHLY HALLOWS, PART II. A resource 224 can have multiple annotations 122 associated with it as well. For example, the reference to the movie in the member's post on the fan club website 120b could refer to either PART I or PART II of the DEATHLY HALLOWS films. Although not depicted, an annotation 122 could be associated with the site for each film. A resource 224 might also explicitly relate to two or more topics, and multiple annotations 122 can be associated with each resource 224 to reflect the occurrence of multiple topics. For instance, if J. K. Rowling's website listed or discussed each of the books that she had authored, separate annotations 122 can be provided to associate her official website 120a with a topic for each listed book.

In some implementations, evaluating resource 224 content and creating annotations 122 can be automated, such as by a computer system that crawls resource 224s in one or more corpora of data and across one or more networks, similar to indexing by the back end 226 of the search engine 216. In some implementations, evaluating resource 224 content and creating annotations can also be performed manually. Evaluating content of a resource 224 can include evaluating anything related to the page such as text, images, advertising content, headings, the domain name, meta data, or more.

The method 100 can determine a score 124a-d for each candidate topic-answer pair 118a-d. The score 124 can indicate a probable relevance of each candidate-topic answer pair 118 to the query 112. For example, since the subject "Harry Potter" in query 112 is subject to multiple interpretations, the score for each candidate topic-answer pair 118 can quantify the likelihood that each candidate-topic answer pair 118 would provide a correct interpretation of the query 112 that a user intended to find. In some implementations, the query 112 is not ambiguous and only one candidate topic 118 is identified and one candidate topic-answer pair 118 generated. The score 124 for the pair 118 may then indicate how relevant a response from the Q&A method 100 is to the query 112.

The scores 124 can be based on one or more factors including an occurrence of the candidate topic 114 in the annotations 122 of the resource 224s referenced by one or more of the search results 120. For example, candidate topic 114d, HARRY POTTER AND THE DEATHLY HALLOWS, PART II (film), occurs in annotations 122b and 122c for the resource 224s of two of the search results 120b and 120c. From this match, the method 100 can infer that corresponding candidate topic-answer pair 118d likely has some relevance to the query 112, and therefore the pair's 118d score 124d can be adjusted by an amount that reflects such relevance. For example, the scores 124a-d can start with an initial score of zero and can be increased when one or more factors indicate that their respective candidate topic-answer pairs 118a-d are relevant to the query 112. Thus, the two annotations 122b and 122c that correspond to candidate-topic 118d increase the score 124d from 0 to 50. Candidate topic 114a, HARRY POTTER AND THE PHILOSOPHER'S STONE (book) occurs in annotation 122a that is associated with the search result 120a for J. K. Rowling's Official website. With only one corresponding annotation 122, its score is raised to 20. However, candidate topics 114b and 114c do not occur in any of the annotations 122a-c, and their scores remain zero.

In some implementations, the scores 124 can be based on one or more other or additional factors. For instance, the score 124 for a given candidate topic-answer pair 118 can be based on an occurrence of the answer 116 in annotations 122 of the resource 224s referenced by the one or more search results 120. Thus, if the query 112 asked, "Who wrote Harry Potter and the Chamber of Secrets?", candidate topics 114 might include both the book and film for HARRY POTTER AND THE CHAMBER OF SECRETS. The corresponding answers 116 for the book and film topics are J. K. Rowling (author) and Steve Kloves (screenplay writer), respectively. If most of the search results 120 generated in response to the query 112 reference annotated resource 224s that identifed J. K. Rowling as a topic associated with the resource 224s, whereas relatively few identified Steve Kloves, then the score 124 for the book can be skewed higher than the score 124 for the film.

Scores can also be based on an occurrence of the candidate topic 114 and/or the answer 116 being directly in the resource 224s referenced by the one or more search results 120 rather than or in addition to annotations 122 of the resource 224. For example, some resource 224s may not have an annotation 122 associated with it that matches an answer 116 in one of the candidate topic-answer pairs 118. But if it is known that the resource 224 references one of the candidate topics 114, and the answer 116 that corresponds to the topic 114 is provided in content associated with the resource 224, then the resource 224 is more likely to be relevant to the query 112 and the score 124 can be adjusted accordingly to reflect the likely relevance. For example search result 120b has one annotation 122b associated with it that identifies the topic HARRY POTTER AND THE DEATHLY HALLOWS, PART II (film). There is no annotation 122 with the film's length that matches answer 116d. One reason can be that film running times are not represented as topics in knowledge base 222. If a fan club member posted text on the site saying, "At just 130 minutes, DEATHLY HALLOWS was too short for me!", then the method can use the occurrence of answer 116d in the text or other content of the site to skew the film's score 124b higher. Resource 224 content can be evaluated for the occurrence of answers directly after search results 120 are obtained, or identified from a search index of previously crawled resource 224s, for example.

In some implementations, scores 124 for candidate topic-answer pairs 118 can be based in part on the relevance of the search results 120 to the query 112. Search results 120 can be useful for comparing to candidate topics 114 and answers 116 to disambiguate a query 112 and/or to determine whether to respond to a query 112 with one or more candidate topic-answer pairs 118. The method can leverage a search engine's algorithms that are often sophisticated and finely-tuned to score or rank query interpretations for answering factual questions. Search results 120 are typically ranked according to relevance and presented in descending order of relevance. For example, the top results for a search for "Obama" relate to President Barack Obama, whereas lower-ranked results relate to First Lady Michelle Obama, and their children Malia and Sasha Obama. President Obama is predicted to be most relevant based on, for example, the relatively large amount of resource 224s, web sites, news articles, social media content, and links about him. President Obama's selection can be further based, for example, on historical data that indicates most people who have searched for "Obama" tend to visit resource 224s related to President Obama.

Based on the relevance of the search results 120, a query relevance score 130 can be determined for each result 120 that indicates how relevant each result is to the query 112. Because ranking can be based on relevance, higher ranked search results 120 can have higher query relevance scores 130. The query relevance score 130 can be based on other factors as well, such as an absolute measure of relevance of a result 120 to the query 112 (whereas ranking indicates relative relevance). In some implementations, the scores 124 of candidate topic-answer pairs 118 are based on query relevance scores 130 of the search results 120 that reference a resource 224 with an annotation 122 in which the candidate topic 114 occurs. For example, search results 120a-c are depicted in descending order of relevance as determined by search engine 216. J. K. Rowling's Official Website (120a) is the top-ranked result in response to a query for "How long is Harry Potter." The Harry Potter Fan Club Website (120b) and Harry Potter the Ride site (120c) are the second and third most relevant, respectively. The J. K. Rowling website has a query relevance score 130a of "10 out of 10," the Fan Club Website has a query relevance score 130b of "8 out of 10," and the Harry Potter the Ride website has a query relevance score 130c of "7 out of 10." The scores 124a-c for the candidate topic-answer pairs 118a can be adjusted at least partly as a function of the query relevance scores 130a-c. A highly relevant search result 120 (i.e., high query relevance score 130) with an associated annotation 122 that includes one of the candidate topics 114 can indicate that the corresponding candidate topic-answer pair 118 would be an appropriate response to the query 112. For instance, the score 124a of candidate-topic answer pair 118a can increase based on the top-ranked search result 120a referencing J. K. Rowling's Official website, which is annotated (122a) with the candidate topic 114a, HARRY POTTER AND THE PHILOSOPHER'S STONE (book).

The topic-answer pairs 118 can also be scored based on a confidence measure associated with the annotations 122 that can indicate how certain or how likely it is that a resource 224 is related to an annotated topic 122. For example, the annotation 122a for J. K. Rowling's Official Website 120a includes the book topic HARRY POTTER AND THE PHILOSOPHER'S STONE. However, because the site as a whole is primarily focused on J. K. Rowling rather than her individual books, a low confidence score 128a is assigned to annotation 122a of "3 out of 10." Although not depicted, the J. K. Rowling Website 120a can have additional annotations 122 for different topics associated with the site. An annotation 122 associated with "J. K. Rowling" in this instance would have a higher confidence score 128 than the score 128a for the book. In another example, an annotation 122c for the DEATHLY HALLOWS, PART II (film) is highly relevant to HARRY POTTER THE RIDE as described in the web site referenced by search result 120c. For instance, the ride may follow the storyline of the DEATHLY HALLOWS films. Accordingly, the annotation 122c has a high confidence score of "8 out of 10." Another annotation 122 that included the topic for the ride itself (not depicted), might have an even higher confidence score 128, such as "10 out of 10." Sometimes, an annotated resource 224 may have only vague references to topics included in its content. For example, a resource 224 that mentions only "Harry Potter" without specifying a particular film, book, or other feature that is being discussed is vague. An annotation 122 for such a resource 224 can be created that associates it with a particular book, but the confidence score 128 for the annotation 122 may be low due to uncertainty in determining the correct topic.

The method 100 can determine a score 124 for each of the candidate topic-answer pairs 118 based on any combination of the factors described, as well as additional factors. For example, the pair 124d associated with the DEATHLY HALLOWS, PART II film is shown to have a score 124d of 50, which is highest among all of the candidate topic-answer pairs 118a-d, and therefore can be identified as the candidate pair 118 that is most relevant to answering the query 112. Its high score 124d can be attributed to the occurrence of the candidate topic 114d in two of the top three search results 120b-c. By implication, a candidate pair 118 that has a candidate topic 114 that occurs in an annotation 122 for the top-ranked search result will not always have the highest score 124. The candidates' scores 124 can be based on multiple factors and combinations of factors.

The method 100 can use the candidate topic-answer scores 124 to determine whether to respond to the query 112, and if so, which candidate topic-answer pair(s) 118 to respond with. The method only provides a response 126 if one or more of the candidate topic-answer pairs 118 is determined to be sufficiently relevant to the query 112 to warrant a response. The method can determine whether to respond, for example, by comparing the scores 124 of the candidate topic-answer pairs 118 to a threshold score. Scores 124 that are below the threshold can indicate that the associated candidate topic-answer pair 118 is probably not a good interpretation of the query 112. If the score 124 for each candidate topic-answer pair 118 is less than the threshold, then no response is provided from among the candidate-topic answer pairs 118. If the score 124 of any candidate topic-answer pair 118 is equal to or exceeds the threshold, then a response is provided from among the candidate topic-answer pairs 118 that satisfy the threshold. For instance, given a threshold score of 30, only candidate topic-answer pair 118d has a score 124d that exceeds the threshold, and it selected to respond to the query 112 in response 126. The response 126 includes both the topic 114d and answer 116d so that a consumer of the response can know the particular question that is being answered. Thus, the response can unambiguously state, "The movie HARRY POTTER AND THE DEATHLY HALLOWS, PART II is 130 minutes long."

In some implementations, determining whether to respond can be done without comparing the scores 124 to a threshold. For example, the method may always respond with one or more of the candidate topic-answer pairs 118 so long as a pair is identified. The system can also simply respond with the top-scoring candidate pair 118 or several of the top-scoring candidates 118 without regard to a threshold.

Figure 2:
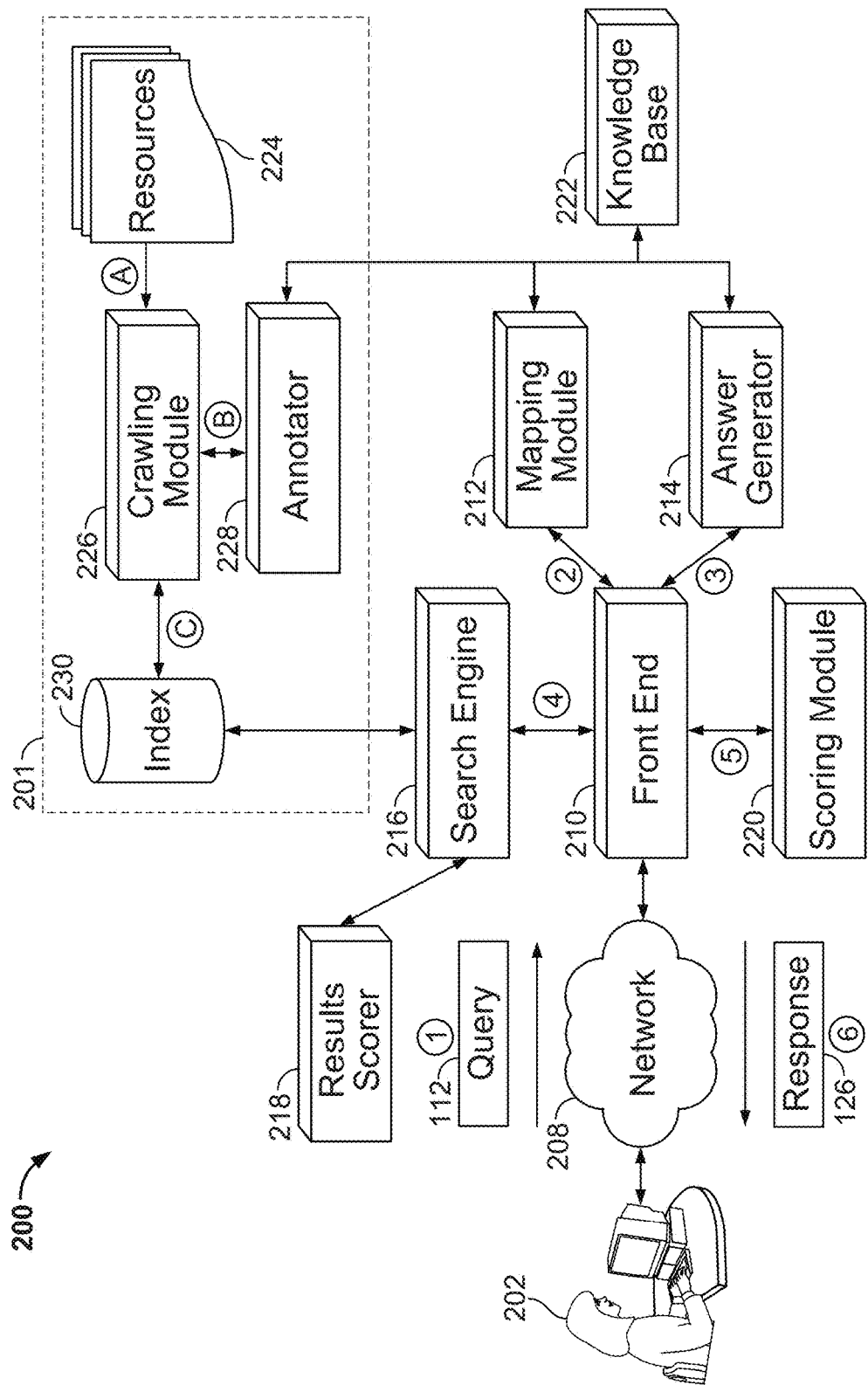
FIG. 2 depicts an example system for determining one or more topic-answer pairs for responding to a query.

FIG. 2 depicts an example Q&A system 200 that can determine whether and how to respond with an answer 116 to a query 112. In some implementations, the system 200 can implement the example method 100 depicted in FIG. 1. The system 200 includes a front-end module 210 that can coordinate data flow and control among the various system modules, receive a query 112, and determine how to respond to a query 112 with one or more answers 126. The system 200 also includes a mapping module 212 for identifying candidate topics 114, an answer generator 214 for determining an answer 116 for each candidate topic 114, a knowledge base 222, a search engine 216 that obtains search results 120 based on the query 112, and a scoring module 220 that determines a score 124 for the candidate topic-answer pairs 118. In some implementations, system 200 can also include a back-end system 201 that can crawl, index, and/or annotate network resources 224. The back-end system 201 can include a crawling module 226, an annotator module 228, and an index 230.

In one example of the Q&A system 200, the front-end module 210 receives a query 112 over network 208. The query 112 can be submitted by a user 202 at a client computing device and transmitted over network 208. The front-end module 210 interfaces with the network 208 to receive the query 112. The query 112 can be in the form of a string of characters that represent one or more words that can be a phrase, clause, sentence, or question, for example. The user 202 can submit the query in an application that is configured to interface with the Q&A system 200, or at a general search tool that can feed the query 202 to one or more different systems such as the Q&A system 200, a local search engine on the client computing device, and/or an internet search engine. The search tool or another application at the client computing device or at a remote server can then determine which of the systems that received the query will provide the most relevant results to the user 202 based on various signals associated with the query 112. The user 202 can communicate with the Q&A system 200 over network 208, which can include, for example, the Internet, a local area network (LAN), a wide area network (WAN), a virtual private network (VPN), and/or a wireless network such as WIFI, a cellular telephone network, or a 3G/4G data network. In some implementations, a user 202 can submit a query 112 at the Q&A system itself without transmitting the query 112 from a remote client computing device and through a network 208.

The front-end module 210 receives the query and can determine how to process the query 112. In some instances, the front-end 210 may pre-process the query 112, which may include removing whitespace, correcting spelling errors, converting between languages, transcribing a voice query to text, and/or structuring the query 112 into a particular format. The front-end module 210 can then submit query 112, whether as received or after pre-processing, to the mapping module 212.

Mapping module 212 can identify one or more candidate topics 114 based on the query 112. For example, for a query 112 that asked, "What is the population of Peru?", the mapping module 212 can identify one or more candidate topics 114 as possible interpretations of "Peru," the subject of the query 112. The mapping module 212 may identify the country of Peru, the city Peru, Nebr., and the city Peru, Ind. as candidate topics 114 for the "Peru" query 112.

The mapping module 212 can map a query 112 to candidate topics 114 using one or more algorithms. In some implementations, the mapping module 112 can determine possible topics 114 using string-matching algorithms. The candidate topics 114 can be identified from among one or more entities in knowledge base 222. The knowledge base 222 is a repository of facts and information about various entities. Because the candidate topics 114 can be selected from knowledge base 222 entities, the entities can also be referred to as topics or known topics. As depicted and described in greater detail in FIG. 5, the knowledge base 222 can include a data graph 500 of interconnected nodes 502 that each represent entities in the data graph. The entities can each include one or more attributes that define particular facts for that entity. Some attributes can form edges 504 in the data graph 500 that indicate relationships between multiple entities. For example, the knowledge base 222 may have an entity for the country Peru. Population, for instance, can be an attribute associated with the country Peru, and its value may be 29,399,817 based on data from 2011. Another attribute may indicate the capital of Peru, and connect the entity for Peru to a separate entity for the city of Lima as the capital of Peru. As the data graph 500 can include a large, increasing number of entities and associated attributes for each entity, it can provide the knowledge base 222 with a substantial repository of information that can form the library from which information is drawn for identifying candidate topics 114 and answers 116 in the Q&A system 200.

In some instances, the mapping module 212 can use additional and/or other techniques for identifying the candidate topics 114 based on the query 112. For example, the mapping module 212 can use other information that is associated with the query 112 and/or user 202 to identify candidate topics 114 that are initially determined to be irrelevant to a particular user 202. For example, if the Q&A system 200 received information that indicated a current or default location of the user 202 or the client computing device that submitted query 112, the mapping module 212 may exclude entities with a location that is greater than a threshold distance from the user 202. Other information that can be used in identifying possible entities to include or exclude from the candidate topics 114 may include information about the relevance or ranking of search results in which one or more possible entities occur, information collected from other users about commonly searched entities, information about how helpful particular entities have been in answering different queries with similar subjects for the user 202 or other users, and information about the user 202 derived from past behavior or an online profile of the user 202. The user 202 can choose to not share information with the Q&A system 200 beyond the query 112 and the user 202 may configure the Q&A system 200 to not store or use information about the user 202 to protect the user's 202 privacy.

The answer generator 214 determines an answer 116 for each candidate topic 114. The answer generator 214 may receive information about the query 112 and the candidate topics 114 that were identified by the mapping module 212. The answer generator 214 can then use this information as parameters in identifying an answer for each candidate topic 114. For example, in the query 112 that asked for the population of "Peru," the mapping module 212 determined three candidate topics 114: Peru the country, the city of Peru, Ind., and the city of Peru, Nebr. The answer generator 214 determines that the populations of these candidate topics 114 are, respectively, 29.4 million, 11,417, and 865 based on data in years 2010 and 2011. The answer generator 214 can identify answers by accessing information from the knowledge base 222. For example, for each candidate topic 114, the answer generator can query the knowledge base 222 for a particular attribute of the knowledge base 222 entity that corresponds to the candidate topic 114. The particular attribute requested by answer generator 216 is based on the query 112. Thus, when the query 112 relates to population, the answer generator 216 can interpret the query 112 and retrieve an appropriate attribute for the candidate topic 114 from knowledge base 222. In the example query 112, the answer generator 116 would request the attribute corresponding to population for each of the candidate topics 114. In some implementations, the relevant attribute may differ among different types of candidate topics 114. For instance, in a query 112 that asked, "How long is Harry Potter", length is the relevant attribute, but its meaning can differ depending on the type of candidate topic 114. For books, length may refer to the number of pages or words in the book. But for a film adaptation of the books, length may refer to the film's running time. The answer generator 214 can disambiguate the relevant attribute for each candidate topic 114 by, for example, referencing a table of synonyms that correlates attribute names in the knowledge base 222 with other terms that can be used to indicate the attributes.

Using the answers 116 identified from knowledge base 222, the answer generator 214 can also generate, for each candidate topic 114, a candidate topic-answer pair 118 that includes both the candidate topic 114 and the answer 116 that has been identified for the topic 114. The candidate topic-answer pairs 118 can then be scored and one or more of the candidate topic-answer pairs 118 can be provided to the user 202 based at least in part on the scores 124.

The search engine 216 can obtain search results 120 based on the query 112 for the system 200 to use in determining a score for the candidate topic-answer pairs 118. The search results 120 may reference various resources 224 including electronic documents, PDFs, websites, images, audio files, and/or webpages. One or more of the referenced resources 224 may be an annotated resource, which is a resource 224 that has an annotation 122 associated with the resource 224 that identifies one or more likely topics associated with the resource 224. The annotations 122 can include one or more topics from the knowledge base 222. For example, the official website for Peru, Ind. may have an annotation 122 that indicates the page is related to Peru, Ind., which may be a topic or entity represented by a node 502 in the data graph 500 in knowledge base 222. A resource 224 can also have multiple annotations 122 associated with the resource 224, for instance, when the resource 224 is likely related to more than one topic.

The search engine 216 can have a back-end subsystem 201 that crawls, indexes, and/or annotates resources 224 across one or more systems or networks. The back-end subsystem 201 may include a crawling module 226 that crawls the Internet, for example, and indexes resources 224 encountered in the crawl. In some implementations, the crawling module 226 accesses a first resource that links to one or more other resources. The crawling module 226 may load the first resource and store its text in index 230, which is a database that includes information about the crawled resources 224 and their content, such as text, that is associated with the resources 224. Once the crawling module 226 stores information about the first resource in index 230, it can then load the other resources 224 that are linked from the first resource and repeat the indexing process. By repeatedly accessing and indexing resources 224 linked from other resources 224, the crawling module 226 can capture and index a substantial portion of the resources 224 that are accessible to the crawling module 226. The crawling module 226 can crawl and index the resources 224 even before a query 112 is received by the Q&A system 200 or before search engine 216 submits the query 112 to obtain search results 120. The search engine 216 can then obtain search results 120 by searching index 230 rather than directly searching the resources 224.

The crawling module 226 can also interface with annotator 228. As the crawling module 226 crawls resources 224, the annotator 228 can generate annotations 122 for one or more of the resources 224. In some implementations, the annotator 228 can perform an automatic evaluation of a resource 224, including, for instance, content associated with the resource 224, and determine one or more likely topics from knowledge base 222 that are likely associated with the resource 224. For example, if a given resource 224 was the official website for the New York Yankees, the annotator 228 may identify three topics from knowledge base 222 that are likely associated with the site: The New York Yankees MLB ball club, baseball, and New York City. The annotations 122 can be stored in knowledge base 222 or in a separate annotations database that references the knowledge base 222. Furthermore, the annotator 228 can determine a confidence score 128 for each annotation 122 that indicates the likely strength of the association between the resource 224 and the annotation 122. In the Yankees example, the annotation 122 for the New York Yankees MLB ball club may have a high confidence score 128 because the website is the official site for the Yankees and is primarily related to the Yankees franchise. The annotations 122 that identify baseball and New York City as topics may each have lower confidence scores 128 because the Yankees site is less directly related to these topics, even though they are relevant to the site to some degree. In some situations, the annotator 228 may not be able to discern any topic that a particular resource 224 is about, and therefore the annotator 228 may not generate any annotation 122 for that resource, or it may determine one or more annotations 122 that have low confidence scores 128 because of the uncertainty.

The search engine 216 can also include a results scorer 218, which is a module that may determine and assign a query relevance score 130 to search results 120 that the search engine 218 obtains based on the query 112. The query relevance score 130 can indicate how relevant each result 120 is to the query 112. Because ranking can be based on relevance, higher-ranked search results 120 can have higher query relevance scores 130. The query relevance score 130 can be based on other factors as well, such as an absolute measure of relevance of a result 120 to the query 112, whereas ranking indicates relative relevance. For example, based on the query 112 that asked, "What is the population of Peru?", the top search result 120 may reference the official website for the government of the South American country of Peru. Because the search engine 116 determined that the government website was the most relevant resource 224 based on the query 112, the results scoring module 218 may assign a high query relevance score 130 to the search result 120. If the top fifteen search results 120 each referenced websites related to the country of Peru, and only lower-ranked search results 120 referenced resources 224 pertaining to the cities of Peru in either Indiana or Nebraska, then results scorer 218 may assign lower query relevance scores 130 to the search results 120 related to these American cities.

System 200 also includes a scoring module 220 that determines a score 124 for each candidate topic-answer pair 118. The score 124 for each candidate topic-answer pair 124 can be based on one or more factors including an occurrence of the candidate topic 114 in the annotations 122 of the resources 224 referenced by one or more of the search results 120, an occurrence of the answer 116 in annotations 122 of the resources 224 referenced by one or more of the search results 120, and/or an occurrence of the candidate topic 114 or answer 116 in the resources 224 referenced by one or more of the search results 120. The candidate pair scores 124 can indicate how likely it is that each candidate topic-answer pair 118 will be responsive to the query 112. The system 200 can use the scores 124 to determine whether to respond to a query 112 and in selecting one or more pairs 118 to respond with. Thus, in some instances when the query 112 is vague or ambiguous, the score can be used to disambiguate a query 112 by indicating which topic-answer pairs 118 that the user 202 is most likely interested in.

In some implementations, higher candidate pair scores 124 can indicate more likely relevant candidate topic-answer pairs 118, and the lower candidate pair scores 124 can indicate less likely relevant candidate topic-answer pairs 118. The candidate pair scores 124 may each start with an initial score 124 of zero, and as various factors indicate that a given candidate topic-answer pair 118 is more likely to be relevant to the query 112, the scoring module 220 can increase the candidate pair score 124 by some amount.

The scoring module 220 can increase a candidate pair score 124 when the candidate topic 114 in a respective candidate topic-answer pair 118 occurs in the annotations 122 of the resources 224 reference by one or more of the search results 120. For instance, in the example query 112 for the population of Peru, if the top two search results 120 obtained by search engine 216 for the query 112 were the country of Peru's official website and an online encyclopedia page about the country of Peru, the candidate pair score 124 for the pair 118 that includes the candidate topic 114 for the country of Peru can be increased based on each web site having an associated annotation 122 that identified the country of Peru. In some implementations, the scoring module 220 can increase the candidate pair score 124 based on each annotated resource 224 referenced by search results 120 that is associated with an annotation 122 in which the candidate topic 114 occurs. Thus, the scoring module 220 may increase the score 124 for the candidate topic-answer pair 118 that relates to the country of Peru by a first amount based on the country of Peru's official website having an annotation 122 for the country of Peru, and also increased by an additional amount based on the encyclopedia page annotation 122 for the country of Peru.

The scoring module 220 can also score the candidate topic-answer pairs 118 based on occurrences of the answers 116 in the annotations 122 of the resources 224 referenced by one or more of the search results 120. For example, if the query 112 asked about the leader of Peru rather than population, the top search result 120 generated by search engine 216 in response to query 112 may again be the official government website for the country of Peru. The website may have a first annotation 122 that identifies a topic of the website as the country of Peru. However, annotator 228 may have also determined that the website is related, to a lesser degree, to Ollanta Humala, the President of Peru, and generated a second annotation 122 that identifies Ollanta Humala as a topic of the site. Answer generator 214 may have also identified Ollanta Humala as the answer 116 to the query 112 for the candidate topic 114 of the country of Peru. The occurrence of the answer 116 for a candidate topic-answer pair 118 in an annotation 122 of a resource 224 referenced by one or more search results 120 can cause the scoring module 220 to increase the score 124 for a candidate topic-answer pair. Thus, scoring module 220 may increase the country of Peru's candidate pair score 124 to reflect the fact that Ollanta Humala occurs in both answer 116 for the pair 118 and in the annotation 122 for the official government website.

The scoring module 220 can also generate candidate pair scores 124 based on an occurrence of the candidate topic 114 and/or answer 116 in the resources 224 that one or more of the search results 120 reference. Even when a resource 224 has not been annotated with a candidate topic 114 or answer 116, the fact that it was referenced by search engine 216 in search results 120 can indicate that it still may be relevant to the score 124 for a candidate topic-answer pair 118. For instance, if the content of the resource 224 references the candidate topic 114 or answer 116, the scoring module 220 can increase the candidate pair score 124 for a corresponding pair 118 based on such content. Sometimes, answers 116 determined by the answer generator 214 may not correspond to topics in knowledge base 222 that annotator 228 can generate an annotation 122 for. For example, the answer 116 for the population of the country of Peru is approximately 30.1 million people. While population is an attribute for the entity Peru in knowledge base 222, the population itself may not be an entity in knowledge base 222 and therefore may not be subject to annotation. However, if the top two search results 120 reference pages that include text about the population of the country of Peru, the scoring module 220 can use that text to infer that the candidate topic-answer pair 118 for the country of Peru is likely to be relevant to query 112 and increase the candidate pair score 124 accordingly.

The scoring module 220 can determine candidate pair scores 124 based on any combination of the factors described, as well as additional factors. In some implementations, the scoring module 220 can also determine candidate pair scores 124 based on the query relevance scores 130 of the one or more search results 120. For example, in response to the query 112, "What is the population of Peru?", search engine 216 may obtain search results 120 that include a top-ranked search result 120 that references a first website for the country of Peru, and a nineteenth-ranked search result 120 that references a second website for the city of Peru, Nebr. The search result 120 for the first website may have a high query relevance score 130 and the second website may have a relatively lower query relevance score 130. Using these query relevance scores 130, the scoring module 220 can skew the candidate pair score 124 for the country of Peru higher than the candidate topic-answer pair 118 for Peru, Nebr. because the site about the country was more relevant to the query 112 in the search results 120 than the site about the Nebraskan city. The query relevance scores 130 thus provide a signal to scoring module 220 that certain search results 120 are likely to be more relevant to the query 112 than others and these differences can be accounted for by varying the impact that differently ranked search results 120 have on the candidate pair scores 124.

In some implementations, the scoring module 220 can also base the candidate pair scores 124 on the confidence scores 128 associated with annotations 122. The confidence scores 128 indicate an estimated strength of the correlation between an annotation 122 and the resource 224 that it annotates. An annotated resource 224 that is certainly and primarily related to the topic identified in an associated annotation 122 may have a higher annotation confidence score 128, whereas an annotated resource 224 that less clearly relates to the topic identified in an annotation 122 may have a lower confidence score 128. The scoring module 220 can use the occurrence of candidate topics 114 or answers 116 in annotations 122 of resources 224 referenced by one or more search results 120 to determine candidate pair scores 124. The higher that the confidence scores 128 are for the annotations 122 that the scoring module 220 uses to adjust the candidate pair scores 124, the scoring module 220 can increase the candidate pair scores 124 to a greater degree than if the confidence scores 124 were lower.

The front-end module 210 can determine whether to respond to the query 112 with one or more of the candidate topic-answer pairs 118 based on the candidate pair scores 124. The front-end only provides a response 126 if the system 200 determines that one or more of the candidate topic-answer pairs 118 is sufficiently relevant to the query 112 to warrant a response. The front-end 210 can determine whether to respond, for example, by comparing the scores 124 of the candidate topic-answer pairs 118 to a threshold score. Scores 124 that are below the threshold can indicate that its associated candidate topic-answer pair 118 is probably not a good interpretation of the query 112. If the score 124 for each candidate topic-answer pair 118 is less than the threshold, then no response is provided from among the candidate topic-answer pairs 118. If the score 124 of any candidate topic-answer pair 118 is equal to or exceeds the threshold, then the front-end 210 can respond from among the candidate topic-answer pairs 118 that satisfy the threshold. In some implementations, the front-end 210 can determine whether to respond to query 112 without comparing the scores 124 to a threshold. For example, the front-end 210 can be configured to always respond with one or more of the candidate topic-answer pairs 118 so long as any pair at all is identified by the mapping module 212. The system 200 can also respond with just the top-scoring candidate pair 118 or several of the top-scoring candidates 118 without regard to a threshold.

Figure 3:
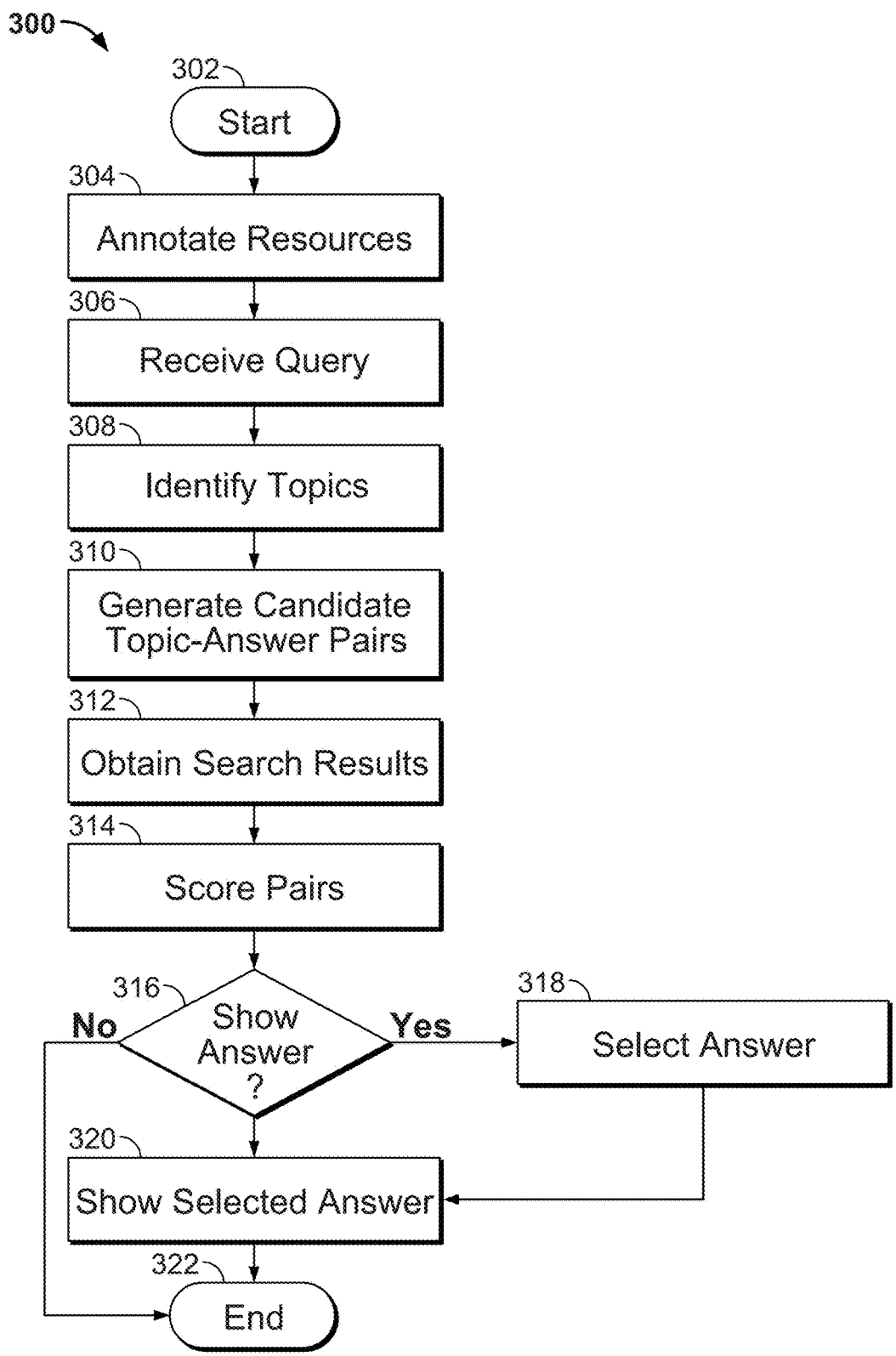
FIG. 3 depicts an example method for determining whether and how to respond to a query with one or more topic-answer pairs.

FIG. 3 depicts an example method 300 for determining whether and how to respond to a query 112 with one or more topic-answer pairs 118.

The method 300 can start by annotating resources 224, as shown in operation 304. The resources 224 can be electronic documents such as PDFs, webpages, text documents, or multimedia files, for example, and can be located in one or more corpora of data in a private network or across one or more public networks such as the internet. Annotation can be performed by the annotator 228 as shown in FIG. 2 as part of a back-end subsystem 201 for a search engine 216 or Q&A system 200. Annotating resources 224 can include an automatic or manual evaluation of content associated with the resources 224 to determine one or more topics that one or more of the resources 224 likely pertains to. The annotated topics may correspond to topics stored in a factual repository such as knowledge base 222, and which can be represented by nodes 502 in a data graph 500 of interconnected nodes 502 that each represent a topic in the knowledge base 222.

At operation 306, the method 300 includes receiving query 112. The query 112 can be submitted by a user 202 at a client computing device and transmitted over a network 208. The method 300 can also receive queries 112 at the Q&A system 200 rather than from a remote client device. The query 112 can be of any form such as a natural language query and the query 112 may comprise one or more words that may be a phrase, clause, question, or sentence. The query 112 may include a request for an answer 116 to a question in the query 112. In some implementations, the method 300 may perform one or more pre-processing operations to convert the query 112 to a suitable form for processing in other portions of the method 300. For example, spelling or grammatical corrections can be made, a query subject identified or isolated, and/or the query 112 may be converted to a different language. The operations at stage 306 can be performed, for example, by the front-end module 210 in Q&A system 200.

At operation 308, the method 300 identifies candidate topics 114 based on the query 112. The candidate topics 114 can be identified from topics in the knowledge base 222. Method 300 can identify the candidate topics 114 using one or more techniques. In some implementations, the method 300 determines one or more words from the query 112 that may be the subject or object of the query 112, for example. The method 300 can compare strings or sub strings of the one or more words from query 112 with strings or substrings of topic names from knowledge base 222 to identify corresponding topics in the knowledge base 222 as candidate topics 114. The method 300 may also limit the number of candidate topics 114 that it identifies and it may aim to identify only those topics that are most likely to be relevant to query 112. A subset of the most relevant candidate topics 114 can be determined by comparing topics that have been identified using string-matching algorithms to search results 120 based on the query 112 and/or based on information in knowledge base 222 or a search index 230 that indicates which topics user 202 or other users have found most helpful based on past queries 112. The mapping module 212 can in some implementations perform the operations in stage 308 of method 300.

At 310, the method 300 generates candidate topic-answer pairs 118 for each candidate topic 114 identified by the method at 308. Answer generator 214 can be used in some implementations to perform the operations at 310. For each candidate topic 114, the method 300 identifies an answer 116 that the method 300 determines may be responsive to query 112. The method 300 may identify the answers 116 from knowledge base 222. The answers 116 can correspond to an attribute value of the candidate topics 114 in knowledge base 222. Some answers 116 can occur as a topic that is represented by a node in the data graph 500 in knowledge base 222.

Once the method 300 has identified answers 116 for each candidate topic 114, the method 300 can generate candidate topic-answer pairs 118 that each includes a candidate topic 114 and an answer 116.

At stage 312, the method 300 can obtain search results 120 based on the received query 112. Search results 120 can be obtained, for example, by a search engine 216 such as that depicted in FIG. 2. The method 300 can obtain search results 120 by searching one or more corpora of data on one or more networks for resources 224 that are relevant to the query 112. In some implementations, the method 300 can search an index 201 that includes data from resources 224 that have previously been crawled by an automated bot such as crawling module 226. The index 201 can be configured to provide the search engine 216 with results much quicker than searching the content of resources 224 directly, particularly in large networks like the internet in which there may be billions or trillions of indexable resources 224.

The search results 120 obtained by the method 300 can each reference a resource 224 that has some relevance to the query 112. One or more of the referenced resources 224 may be annotated with one or more topics that are likely associated with the resource 224 as described in stage 304 of the method 300.

At stage 314, the method 300 can determine a candidate pair score 124 for each of the candidate topic-answer pairs 118. The scores 124 can indicate to the method 300 which of the candidate topic-answer pairs 118 are most likely relevant or responsive to the received query 112. Scores 124 can be based one or more factors or combinations of factors. For example, the method 300 may increase a score 124 for a candidate topic-answer pair 118 in which the candidate topic 114 occurs in an annotation 122 of a resource 224 referenced by one or more search results 120. If a candidate topic 114 occurs in annotations 122 for multiple resources 224 in multiple search results 120, the score 124 may be increased a greater amount than if the topic 114 occurred in just one of the resources 224 for a single search result 120. The scores 124 can also be based on an occurrence of the answer 116 for a candidate topic-answer pair 118 in an annotation 122 for a resource 224 referenced by the search results 120. An annotation 122 of the answer 116 can indicate that the resource 224 associated with the annotation 122 is somehow related to the answer 116. Thus, the presence of a search result 120 referencing such resource 224 indicates that the answer 116 is relevant to the query 112, and the method 300 can increase the candidate-pair score 124 accordingly. In some implementations, the method 300 can base the score 124 for one or more of the candidate topic-answer pairs 118 on an occurrence of the answer 116 in the resources 224 referenced by the search results 120 rather than, or in addition to, an occurrence of the answer 116 in an annotation 122. This may be useful, for example, when a resource 224 includes the answer 116 in content of the resource 224, but the answer 116 may not correspond to a topic in knowledge base 222, or the method 300 may have determined not to annotate the resource 224 with the answer 116 because the resource is primarily about other topics. Even when the answer 116 is not in an annotation 122, its presence in a resource 224 referenced by the search results 120 indicate that the resource 224 may still be relevant to the query 112.

In some implementations, the method 300 can also base scores 124 for the candidate topic-answer pairs 118 on other factors. In one example, the method 300 can determine a query relevance score 130 for one or more of the search results 120 that indicate how relevant each search result 120 is to the query 112. The query relevance score 130 for each search result 120 may have a relative component and/or an absolute component. The relative component of the query relevance score 130 can indicate where each search result 120 ranked among the obtained search results 120. For instance, the top-ranked search result 120 is usually determined by a search engine 216 that implements the method 300 to be the most relevant search result 120 to the query 112, and would have a correspondingly higher query relevance score 130 than lower-ranked search results 120. However, if none of the search results 120 are particularly relevant to the query 112, then an absolute component of the query relevance score 130 can cause the score 124 to be lower. The method 300 can then make the candidate pair scores 124 at least partially a function of the query relevance scores 130. For example, if the method 300 determines to increase the score 124 for a candidate pair 118 because the candidate topic 114 occurs in an annotation 122 of a resource 224 reference by a search result 120, the amount that the pair score 124 is increased can depend on the query relevance score 130 of the search result 120. Thus, if the candidate topic 114 occurs in an annotation 122 associated with a top-ranked search result, then the candidate topic 114 is likely to be very relevant to the query 112 and the candidate pair score 124 can be increased more than if the annotation 122 in which the candidate topic 114 occurred was associated with a resource 224 referenced by a lower-ranked search result 120.

The method 300 can also base the score 124 for the candidate topic-answer pairs 118 on a confidence score 128 associated with the annotations 122. Confidence scores 128 indicate the likelihood that an annotated resource 224 is actually related to the topic identified in an annotation 122 associated with the resource 224. If the content of the resource 224 is primarily related to the topic occurring in an associated annotation 122, then the method 300 may assign a high confidence score 128 to the annotation 122. However, if at stage 304 the method 300 was unable to discern whether the annotated topic is really a focus of the page, or if the method 300 determines that the topic is relevant but not a strong focus of the page, then the method 300 may assign the annotation 122 for the resource 224 a low confidence score 128. The method 300 can then factor the confidence scores 128 into its determination of the candidate pair scores 124. When the method 300 bases the candidate pair scores 124 on annotations 122 that have higher confidence scores 128, the method 300 can increase the candidate pair scores 124 a higher amount than if the candidate pair scores 124 are based on annotations 122 that have lower confidence scores 128.

At stage 316, the method 300 can then determine whether to show an answer 116 from one or more of the candidate topic-answer pairs 118. To make this determination, the method 300 may compare each of the scores 124 for the candidate topic-answer pairs 118 to a threshold score. If any of the candidate pair scores 124 satisfy the threshold, then the method can determine to respond to the query 112 with an answer 116 and proceed to stage 318. However, if the none of the candidate topic-answer pairs 118 have a score 124 that satisfies the threshold score, then the method 300 may choose not to show an answer 116 in response to the query 112 because the scores 124 indicate that none of the candidate topic-answer pairs 118 are sufficiently relevant to the query 112. In some implementations, the threshold score can be adjusted by a user or the method 300 may determine an appropriate threshold based on historical indications of how responsive past answers 116 have been to past queries 112. The method 300 can also be configured to always show at least one answer 116, regardless of whether any of the candidate pair scores 124 satisfy a threshold score. If the method 300 determines that it will not respond to the query 112 with an answer 116, then the method 300 may end at stage 322.

If the method 300 determines that it will respond to the query 112 with an answer 116, then the method 300 proceeds to stage 318 in which the method 300 can select one or more answers 116 to show. The method 300 can choose which of the answers 116 to respond with based on the scores 124 for the candidate topic-answer pairs 118. For example, the method 300 may respond with only the answer 116 in the candidate topic-answer pair 118 that has the highest candidate pair score 124. It can also respond with any of the answers 116 that have an associated candidate topic-answer pair 118 with a score 124 that satisfies the threshold score. In some implementations, the method 300 may receive user input that directs how the method 300 should select which answers 116 to respond with, such as whether to respond with one answer 116 or multiple answers 116.

After the method 300 selects one or more answers 116 to respond to the query 112 with, the method 300 shows the selected answers 116 at stage 320. The method 300 can present the selected answers 116 to a user at a client computing device, or can transmit the answers 116 over a network 208 for a client computing device to process in any way, including, for example, presenting the answers 116 at an interface for a Q&A system 200. In some implementations, the method 300 may show both the selected answers 116 and their corresponding candidate topics 114 so that the user can know precisely what question is being answered in response to the query 112.

Figure 4:
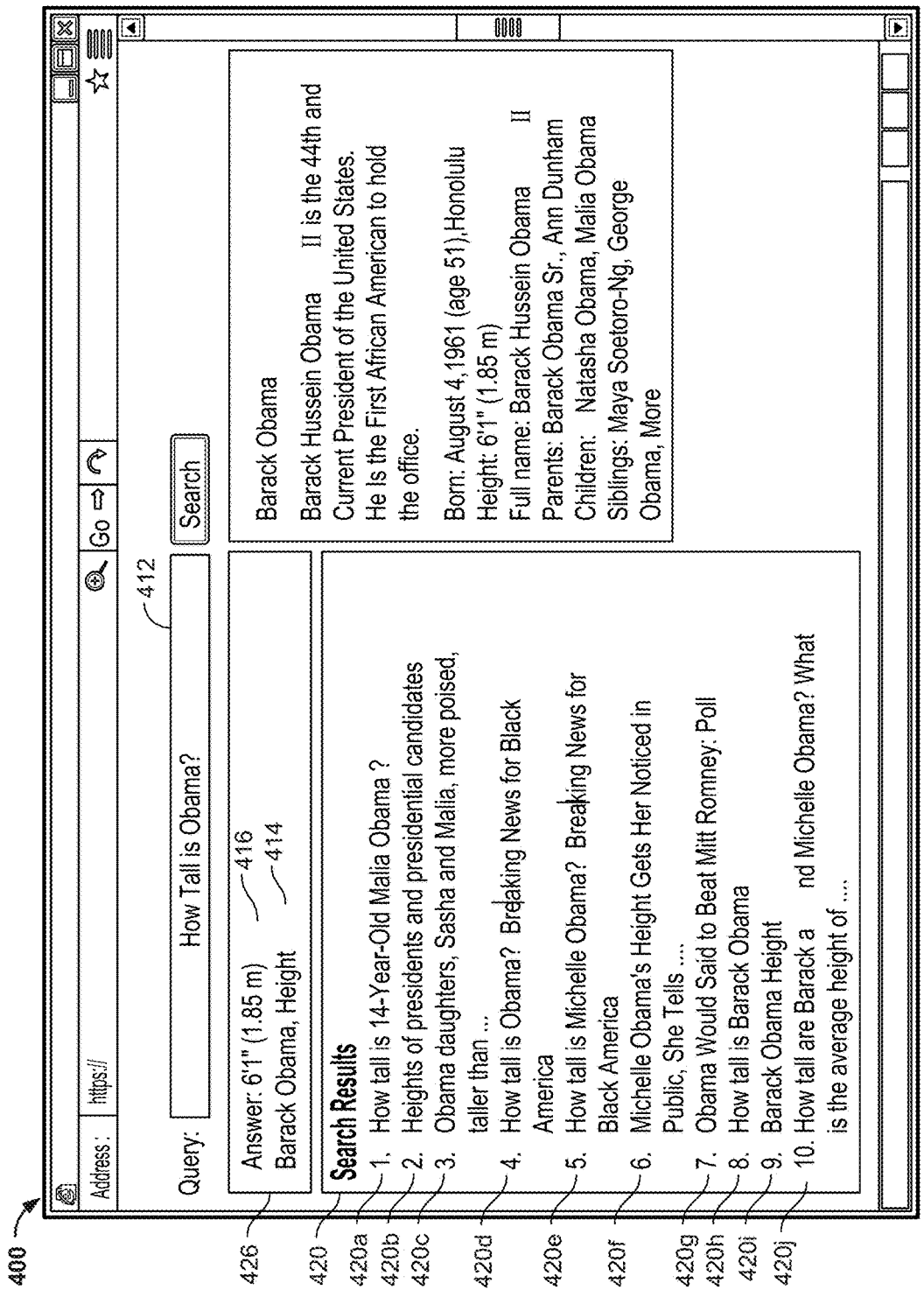
FIG. 4 depicts an example search result page including a selected topic-answer pair provided to a user.

FIG. 4 is an example search result page 400 that shows a response 126 and search results 420 according to one implementation of the Q&A systems and methods that this document describes. A user 202 is shown to have submitted a query 412 that asks "how tall is Obama." The query 412 is ambiguous because "Obama" may refer to any person named Obama, including anyone in the First Family. Thus, the mapping module 212 in the Q&A system 200 or stage 308 in the method 300 may identify President Barack Obama, First Lady Michelle Obama, and First Children Sasha Obama and Malia Obama as candidate topics 114 for the query 412. The knowledge base 222 can provide an answer 116 for each candidate topic 114, thus forming candidate topic-answer pairs 118.

A search engine 216 obtains search results 420 for the query 412. The search results 420 each reference a resource 224, one or more of which may be annotated. The search results 420 are shown in descending order of relevance to the query 112. Thus, the top-ranked search result 420a is about Malia Obama's height. The second-ranked search result 420b is an online encyclopedia webpage about the heights of U.S. presidents, and three of the following four search results 420c-f link to pages about the First Lady or First Children rather than President Obama.

The search results page 400 also includes a factual response 426 that answers the query 412. The response 426 indicates that the topic 114 selected by the Q&A system 200 or methods 100 or 300 is President Barack Obama and that his height is 6 feet, 1 inch. This example shows that even though the top search result 420a, and several of the top few search results 420a-f that the search engine 216 generated in response to the query 412 are about members of the President's family rather than the President himself, the system 200 or methods 100 or 300 determined that President Obama's height was the most relevant response 426 to the query 412. This can happen because the systems and methods described herein may select a candidate topic-answer pair 118 based on a number of factors relating to the search results 420, annotations 122 of resources 224 referenced by the search results 420, and the content of the annotated resources 224, for example. More search results 420 related to Barack Obama and his height than top-ranked Malia Obama, for example, and therefore the Q&A system 200 or methods 100 or 300 selected answer 116 relating to Barack Obama to respond to the query 412.

Figure 5:
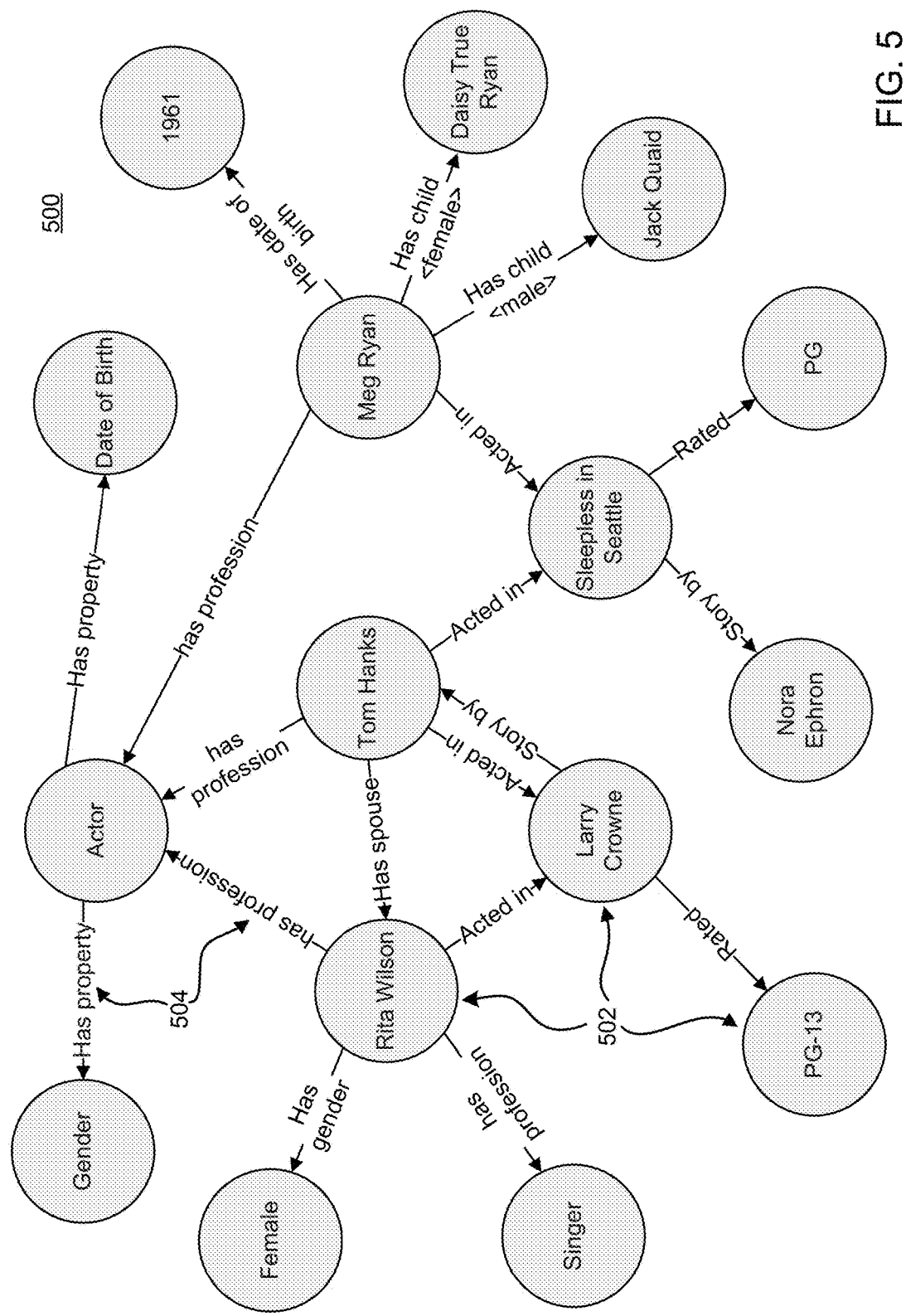
FIG. 5 depicts an example data graph of interconnected nodes that represent topics in a knowledge base.

FIG. 5 is a data graph 500 in accordance with an example implementation of the techniques described herein. The data graph 500 may represent the storage and structure of information in the knowledge base 222. Such a data graph 500 stores nodes 502 and edges 504, from which a graph, such as the graph illustrated in FIG. 5 can be created. The nodes 502 may be referred to as topics or entities, and the edges 504 may be referred to as attributes, which form connections between two topics. In some implementations, candidate topics 114, answers 116, and annotations 122 can correspond to one or more of the topics represented by nodes 502 in the data graph 500.

Topics and attributes in the data graph 500 may be stored in knowledge base 222 in a number of ways. In one example, the knowledge base 222 stores triples, also referred to as tuples, that represent the topics and attributes or connections. A triple may include a <subject; predicate; object>format, with the subject representing a starting topic, the predicate representing an outward edge from the subject, and the object representing the topic pointed to by the outward edge. For example, in FIG. 5, one example of a triple is the entity Tom Hanks as the subject, the relationship acted in as the predicate, and the entity Larry Crowne as the object. Of course, a data graph 500 with a large number of topics and even a limited number of relationships may have billions of triples.

Figure 6:
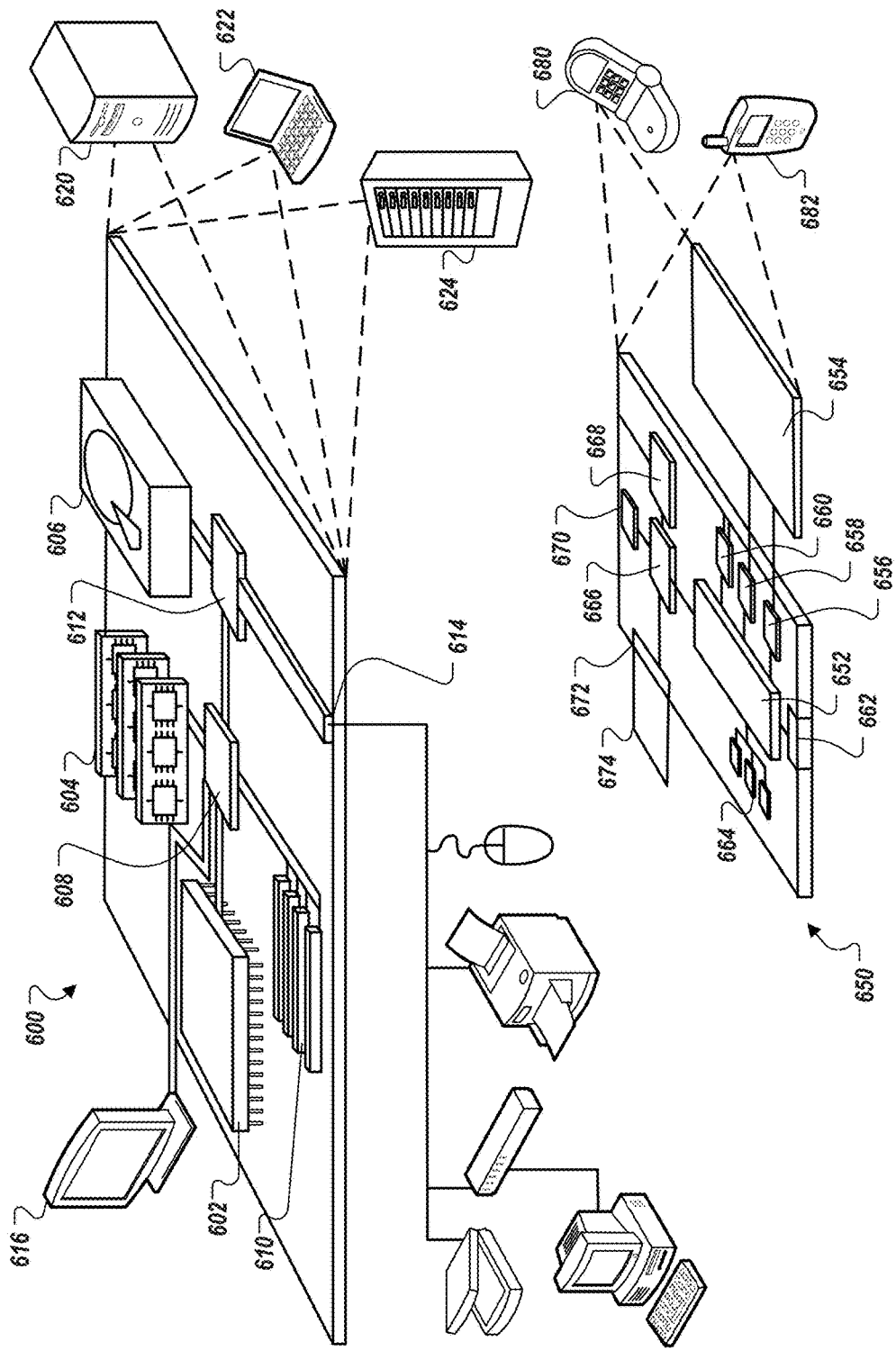
FIG. 6 is a block diagram of computing devices that may be used to implement the systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 610 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems, methods, apparatus, and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    determining, by a computing system, a candidate topic-answer pair for a query, the candidate topic-answer pair including a candidate topic of the query and a candidate answer to the query that relates to the candidate topic, wherein the candidate answer is identified from a first database based on a pre-defined relationship between the candidate topic and the candidate answer in the first database;
    obtaining, by the computing system and from a second database, a set of search results for the query, wherein each search result in the set of search results (i) references a resource that is determined to be relevant to the query and (ii) has a corresponding annotation that identifies a set of topics associated with the resource, wherein the second database is separate from the first database, and the computing system obtains the set of search results from a search system that searches the second database;
    determining, by the computing system, a score for the candidate topic-answer pair that indicates a relevance of (i) at least one of the candidate topic of the query or the candidate answer to the query with respect to (ii) the sets of topics identified by the corresponding annotations for the resources referenced by one or more search results among the set of search results;
    determining, by the computing system, whether the score for the candidate topic-answer pair satisfies a criterion for providing the candidate answer for presentation at a user device that submitted the query; and
    based on determining that the score for the candidate topic-answer pair satisfies the criterion, providing the candidate answer for presentation at the user device responsive to the query.

2. The computer-implemented method of claim 1, further comprising:
    identifying, by the computing system, a plurality of candidate topic-answer pairs, including the candidate topic-answer pair, that each include a respective candidate topic of the query and a respective candidate answer to the query that relates to the respective candidate topic; and
    for each candidate topic-answer pair among the plurality of candidate topic-answer pairs, determining, by the computing system, a score that indicates a relevance of at least one of the respective candidate topic or the respective candidate answer of the candidate topic-answer pair to the sets of topics identified by the corresponding annotations for the resources referenced by one or more search results among the set of search results.

3. The computer-implemented method of claim 2, comprising:
    ranking, by the computing system, the plurality of candidate topic-answer pairs based on the scores; and
    selecting, by the computing system, respective answers from one or more top-ranked candidate topic-answer pairs among the plurality of candidate topic-answer pairs.

4. The computer-implemented method of claim 1, wherein the resource referenced by a first search result among the set of search results for the query comprises a web page.

5. The computer-implemented method of claim 1, comprising determining the score for the candidate topic-answer pair based at least in part on whether the candidate topic of the query occurs in the annotations referenced by one or more search results among the set of search results.

6. The computer-implemented method of claim 5, comprising:
    identifying, for each search result among the one or more search results, a confidence score that indicates a confidence that the set of topics identified by the corresponding annotation for the resource referenced by the search result accurately relate to the resource; and
    determining the score for the candidate topic-answer pair that indicates the relevance of at least one of the candidate topic of the query or the candidate answer to the query further based on the confidence scores.

7. The computer-implemented method of claim 1, wherein the annotations further identify attributes of the sets of topics associated with the resources; and the method comprises determining the score for the candidate topic-answer pair that indicates the relevance of at least one of the candidate topic of the query or the candidate answer to the query based at least in part on a match between the candidate answer to the query and an attribute of a topic referenced by at least one search result among the set of search results.

8. The computer-implemented method of claim 1, comprising determining the score for the candidate topic-answer pair that indicates the relevance of at least one of the candidate topic of the query or the candidate answer to the query based at least in part on whether the candidate topic of the query occurs in the sets of topics for the resources referenced by one or more search results among the set of search results.

9. The computer-implemented method of claim 1, wherein:
identifying the candidate topic of the query comprises selecting the candidate topic from among a plurality of topics represented in the first database; and
identifying the candidate answer to the query comprises selecting the answer from the structured data repository based on the candidate answer being correlated with the topic in the first database.

10. The computer-implemented method of claim 9, wherein the first database is a structured knowledge base storing data that identifies a plurality of real-world entities, attributes of the real-world entities, and relationships among the real-world entities.

11. The computer-implemented method of claim 10, wherein identifying the candidate topic of the query comprises identifying, from the structured knowledge base, a first real-world entity among the plurality of real-world entities; and
the method comprises identifying a second real-world entity, as a second candidate topic of the query, based on the second real-world entity being related to the first real-world entity in the structured knowledge base.

12. The computer-implemented method of claim 1, wherein determining whether the score for the candidate topic-answer pair satisfies the criterion for providing the candidate answer for presentation at the user device comprises comparing the score to a threshold.

13. The computer-implemented method of claim 1, wherein determining whether the score for the candidate topic-answer pair satisfies the criterion for providing the candidate answer for presentation at the user device comprises determining a rank for the score among a plurality of scores corresponding to a plurality of candidate topic-answer pairs.

14. The computer-implemented method of claim 1, wherein providing the candidate answer for presentation at the user device comprises:
generating a web page that is formatted to present the candidate answer to the query in a first region of the web page and a listing of search results in a second region of the web page; and
transmitting code for the web page to the user device.

15. The computer-implemented method of claim 1, further comprising, in response to determining that a second score for a second candidate topic-answer pair does not satisfy the criterion, determining not to provide the answer from the second candidate topic-answer pair for presentation at the user device in a response to the query.

16. A computer-implemented method, comprising:
determining, by a computing system, a candidate topic-answer pair for a query, the candidate topic-answer pair including a candidate topic of the query and a candidate answer to the query that relates to the candidate topic, wherein the candidate answer is identified from a first database based on a pre-defined relationship between the candidate topic and the candidate answer in the first database;
obtaining, by the computing system and from a second database, a set of search results for the query, wherein each search result in the set of search results (i) references a resource that is determined to be relevant to the query and (ii) has a corresponding annotation that identifies a set of topics associated with the resource, wherein the second database is separate from the first database, and the computing system obtains the set of search results from a search system that searches the second database;
ranking the search results in the set of search results based on relevance of the search results to the query;
determining, by the computing system, a score for the candidate topic-answer pair that indicates a relevance of (i) at least one of the candidate topic of the query or the candidate answer to the query with respect to (ii) the sets of topics identified by the corresponding annotations for the resources referenced by one or more search results among the set of search results, including:
identifying that the candidate topic of the query occurs in the annotation for a first search result among the set of search results; and
in response to identifying that the candidate topic of the query occurs in the annotation for the first search result, adjusting the score for the candidate topic-answer pair that indicates the relevance of at least one of the candidate topic of the query or the candidate answer to the query by an amount that is based on the rank of the first search result;
determining, by the computing system, whether the score for the candidate topic-answer pair satisfies a criterion for providing the candidate answer for presentation at a user device that submitted the query; and
based on determining that the score for the candidate topic-answer pair satisfies the criterion, providing the candidate answer for presentation at the user device responsive to the query.

17. A computing system comprising:
one or more processors;
an interface configured to receive over a network a query from a computing device that is separate from the computing system;
a mapping module configured to analyze the query and to identify a candidate topic of the query and a candidate answer to the query that relates to the topic, wherein the candidate topic and the candidate answer form a candidate topic-answer pair, and the candidate answer is identified from a first database based on a pre-defined relationship between the candidate topic and the candidate answer in the first database;
a search engine configured to generate a set of search results for the query by searching a second database that is separate from the first database, wherein each search result in the set of search results (i) references a resource that is determined to be relevant to the query and (ii) has a corresponding annotation that identifies a set of topics associated with the resource;
a scoring module configured to determine a score for the candidate topic-answer pair that indicates a relevance of (i) at least one of the candidate topic of the query or the candidate answer to the query with respect to (ii) the sets of topics identified by the corresponding annotations for the resources referenced by one or more search results among the set of search results; and a front-end server configured to determine based on the score for the candidate topic-answer pair whether to present the candidate answer in a response to the query.

18. The computing system of claim 17, wherein the scoring module is configured to determine the score for the candidate topic-answer pair that indicates the relevance of at least one of the candidate topic of the query or the candidate answer to the query based at least in part on whether the candidate topic of the query occurs in the annotations referenced by one or more search results among the set of search results.

19. The computing system of claim 17, wherein the annotations further identify attributes of the sets of topics associated with the resources; and the scoring module is configured to determine the score for the candidate topic-answer pair that indicates the relevance of at least one of the candidate topic of the query or the candidate answer to the query based at least in part on a match between the candidate answer to the query and an attribute of a topic referenced by at least one search result among the set of search results.

20. A computer-implemented method, comprising:

determining, by a computing system, a candidate topic-answer pair for a query, the candidate topic-answer pair including a candidate topic of the query and a candidate answer to the query that relates to the candidate topic, wherein the candidate answer is identified from a first database based on a pre-defined relationship between the candidate topic and the candidate answer in the first database;

obtaining, by the computing system and from a second database, a set of search results for the query, wherein each search result in the set of search results (i) references a resource that is determined to be relevant to the query and (ii) has a corresponding annotation that identifies a set of topics associated with the resource, wherein the second database is separate from the first database, and the computing system obtains the set of search results from a search system that searches the second database;

determining, by the computing system, a score for the candidate topic-answer pair that indicates a relevance of (i) at least one of the candidate topic of the query or the candidate answer to the query with respect to (ii) the sets of topics identified by the corresponding annotations for the resources referenced by one or more search results among the set of search results, wherein determining the score for the candidate topic-answer pair includes adjusting the score based on whether at least one of the candidate topic of the query or the candidate answer to the query occurs in the sets of topics identified by the corresponding annotations for the resources referenced by the one or more search results;

determining, by the computing system, whether the score for the candidate topic-answer pair satisfies a criterion for providing the candidate answer for presentation at a user device that submitted the query; and based on determining that the score for the candidate topic-answer pair satisfies the criterion, providing the candidate answer for presentation at the user device responsive to the query.

* * * * *